(12) United States Patent
Powell et al.

(10) Patent No.: US 11,092,491 B1
(45) Date of Patent: Aug. 17, 2021

(54) SWITCHABLE MULTI-SPECTRUM OPTICAL SENSOR

(71) Applicant: Microsoft Technology Licensing, LLC, Redmond, WA (US)

(72) Inventors: Karlton David Powell, Lake Stevens, WA (US); Vivek Pradeep, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/908,384

(22) Filed: Jun. 22, 2020

(51) Int. Cl.
*G01N 21/25* (2006.01)
*G01J 3/28* (2006.01)
*G01J 3/02* (2006.01)
*G01J 3/10* (2006.01)
*G01J 3/12* (2006.01)

(52) U.S. Cl.
CPC .......... *G01J 3/2823* (2013.01); *G01J 3/0208* (2013.01); *G01J 3/0229* (2013.01); *G01J 3/108* (2013.01); *G01J 3/2803* (2013.01); G01J 2003/1213 (2013.01); G01J 2003/2826 (2013.01)

(58) Field of Classification Search
CPC ...... G01J 3/51; G01J 3/02; G01J 3/513; G01J 3/2803; G01J 3/46
USPC ....................................................... 356/419
See application file for complete search history.

(56) References Cited

U.S. PATENT DOCUMENTS

| | | | |
|---|---|---|---|
| 6,208,393 B1 | 3/2001 | Bawolek et al. | |
| 7,375,803 B1 | 5/2008 | Bamji | |
| 10,284,826 B2 | 5/2019 | Nam et al. | |
| 2005/0157190 A1* | 7/2005 | Ostromek | H04N 9/045 348/272 |
| 2015/0245767 A1 | 9/2015 | Northcott et al. | |
| 2016/0295133 A1 | 10/2016 | Rudmann et al. | |
| 2017/0067781 A1* | 3/2017 | Darty | G01J 3/0291 |
| 2017/0140221 A1 | 5/2017 | Ollila et al. | |
| 2017/0230551 A1 | 8/2017 | Akkaya et al. | |

* cited by examiner

*Primary Examiner* — Md M Rahman
(74) *Attorney, Agent, or Firm* — Alleman Hall Creasman & Tuttle LLP

(57) ABSTRACT

An optical system, comprising a multi-spectral optical element, a switchable filter, a dual bandpass filter, and a sensor. The multi-spectral optical element receives light in at least a first spectral band and a second spectral band. The dual bandpass filter filters out wavelengths of light in a transition region of the switchable filter between the first spectral band and the second spectral band. The switchable filter filters light received from the dual bandpass filter in the first spectral band in a first mode where the switchable filter transmits light in the first spectral band and in a second mode where the switchable filter does not transmit light in the first spectral band. The sensor is disposed at an image plane, and the multi-spectral optical element is configured to produce a modulation transfer function value that is a above a predetermined threshold for each of the spectral bands.

20 Claims, 9 Drawing Sheets

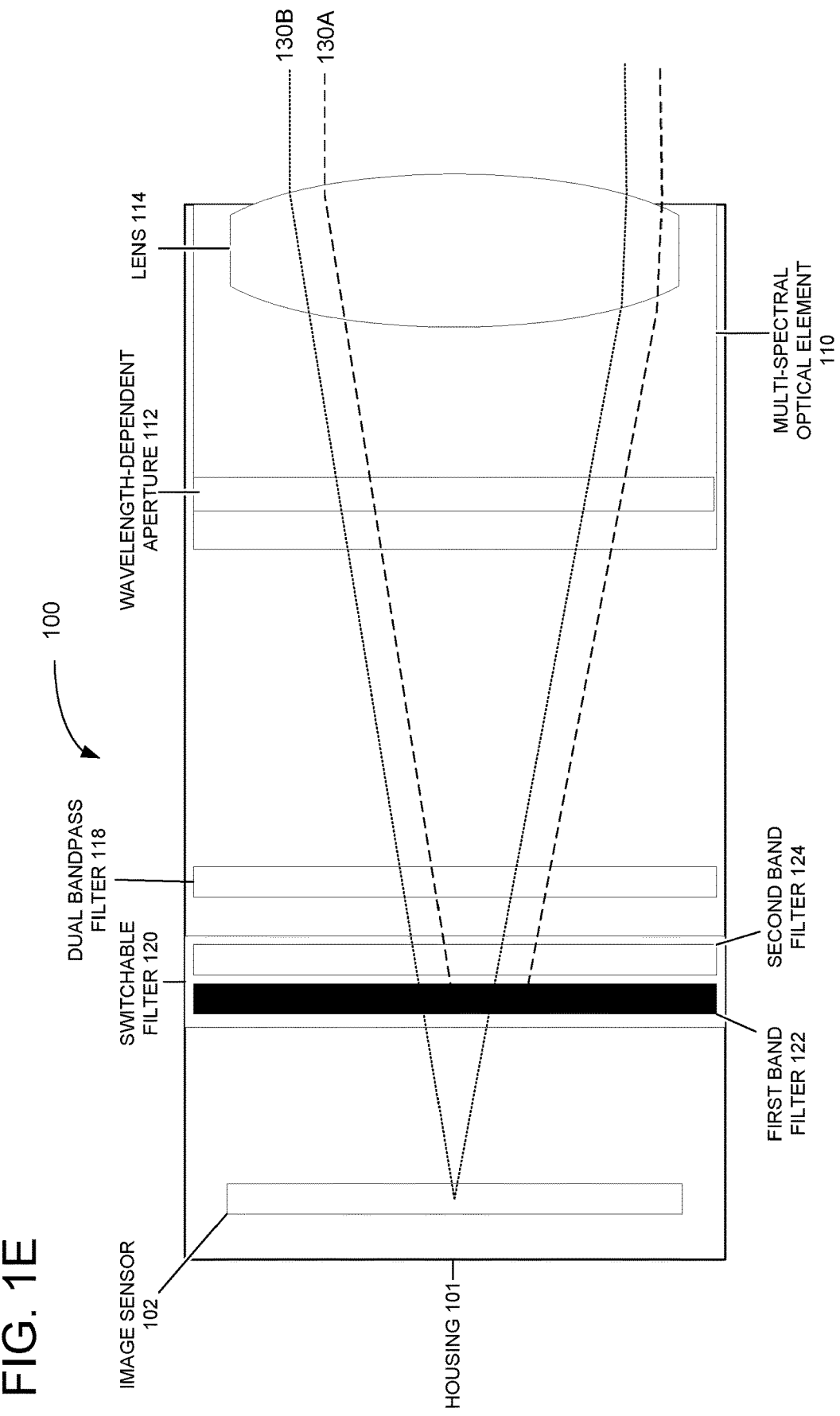

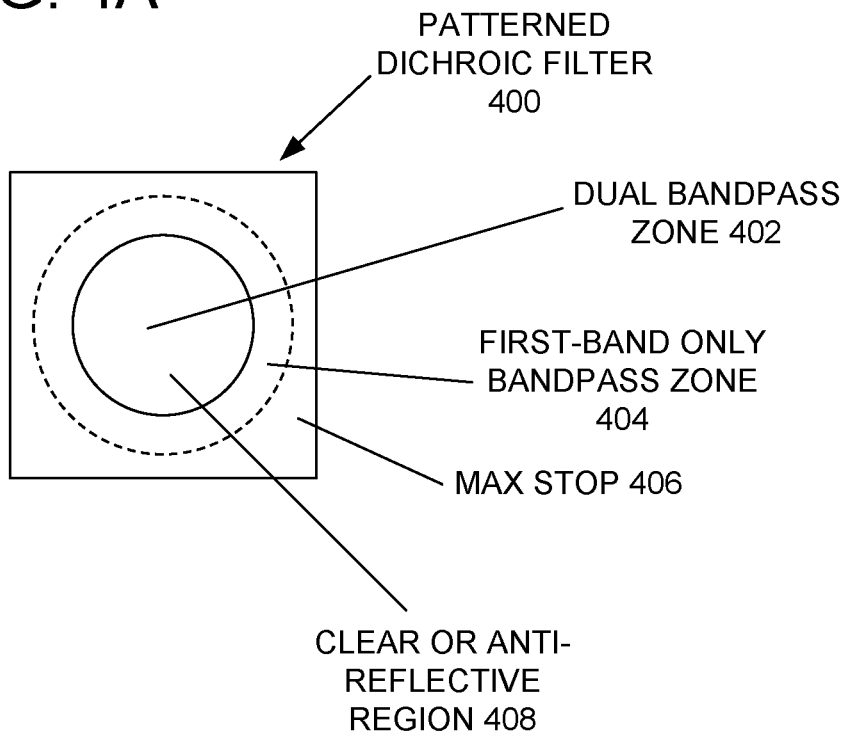
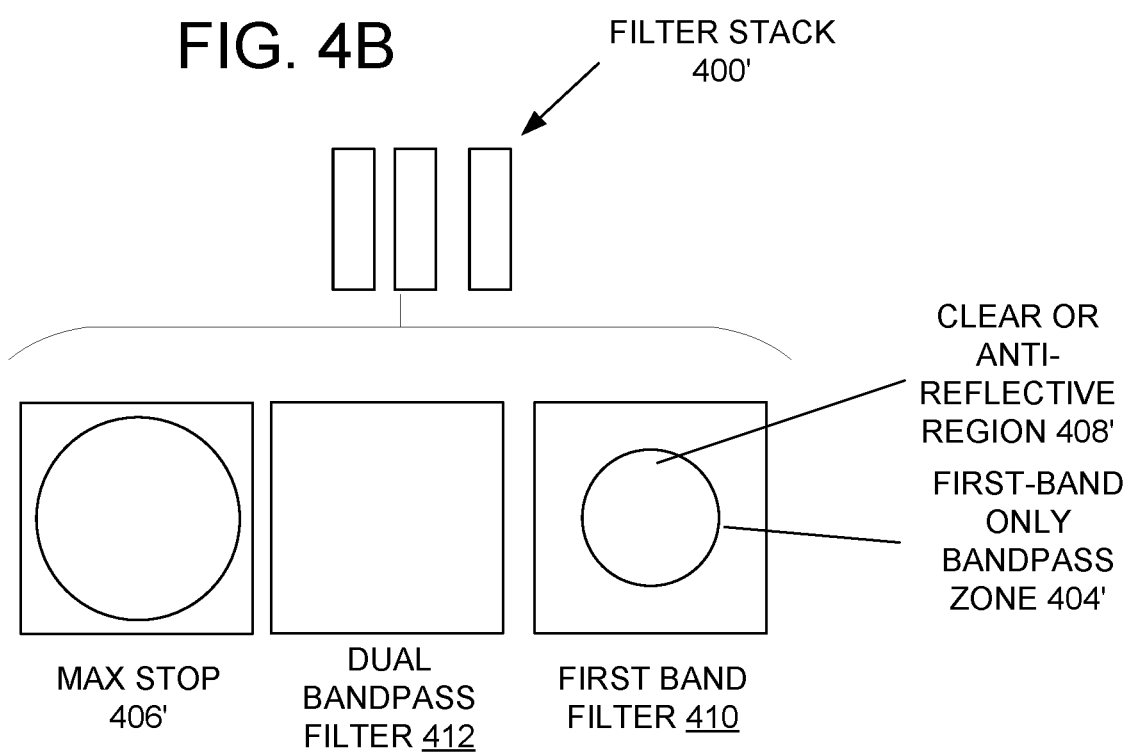

SWITCHABLE MULTI-SPECTRUM OPTICAL SENSOR

BACKGROUND

Optical systems may be configured to capture images via light in multiple spectral bands. For example, an optical system may be configured to capture images using infrared light, visible light, or a combination of infrared and visible light.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An optical system comprises a multi-spectral optical element (e.g., a multi-spectral optical imaging element), a switchable filter, a dual bandpass filter, and a sensor. The multi-spectral optical element is configured to receive light in at least a first spectral band and a second spectral band. The dual bandpass filter disposed between the multi-spectral optical element and the switchable filter, and the dual bandpass filter is configured to filter out wavelengths of light in a transition region of the switchable filter between the first spectral band and the second spectral band, as well as filter out wavelengths of light outside the range spanned by both bands. The switchable filter is configured to selectively filter light received from the dual bandpass filter in the first spectral band in a first mode and in a second mode, such that in the first mode the switchable filter transmits light in the first spectral band and in the second mode the switchable filter does not transmit light in the first spectral band. The sensor is disposed at an image plane and configured to detect light transmitted via the switchable filter, wherein the sensor is sensitive to at least the first spectral band and the second spectral band, and wherein, for the image plane, the multi-spectral optical element is configured to produce a modulation transfer function value that is a above a predetermined threshold for each of the first and second spectral bands with regard to a given spatial frequency.

BRIEF DESCRIPTION OF THE DRAWINGS

FIG. 1A-1E depict a switchable optical sensor system.

FIGS. 4A-4B show wavelength-dependent aperture elements.

DETAILED DESCRIPTION

An optical system may be configured to image light in two or more spectral bands. For example, a camera may be configured to capture still images and/or video in a first band including infrared (IR) light, and in a second band including visible (VIS) light. Capturing images in more than one spectral band may improve the capabilities of the optical system, for example, by enabling the use of the captured imagery for multiple different domains that may benefit from images in each of the two or more spectral bands. In some examples, imaging in one or both bands may allow collecting more and/or different relevant data. For example, for cameras equipped with onboard IR illumination emitted from an IR illuminator in proximity to the camera and used to flash the object scene, IR light irradiance may be reduced by the square of the object distance from an illuminator, enabling the estimation of depth based on IR illumination of a subject. However, VIS imagery may be desirable, for example, to extract color-dependent information from a scene (e.g., to display a color, or red-green-blue (RGB), picture to a user). Accordingly, an optical system configured to image IR and VIS may be further configured to utilize both spectral bands, e.g., to display a scene with color imagery of a scene and annotation information pertaining to estimated distance of objects in the scene from the camera. In further examples, an optical system may be configured to capture IR imagery for computer processing (e.g., machine learning, depth-detection, skeletal position estimation, gesture detection, and/or any other suitable processing enabled by IR imagery). Additionally, the optical system may be configured to capture VIS imagery for presentation to a user (e.g., real-time camera view in a photo-conferencing application, in an augmented reality head-mounted device, and/or in any other suitable application) and/or further processing (e.g., object detection, face detection, iris scanning). Further, since the optical system is not limited to capture of only one of the bands, and may be used to capture frames for multiple bands of light, i.e. IR and VIS, the surface area real estate on a device that is required to support multi-spectral camera function may be reduced, since two light band captures may be performed by the same camera within the space required of only one camera module.

Figure 1A:
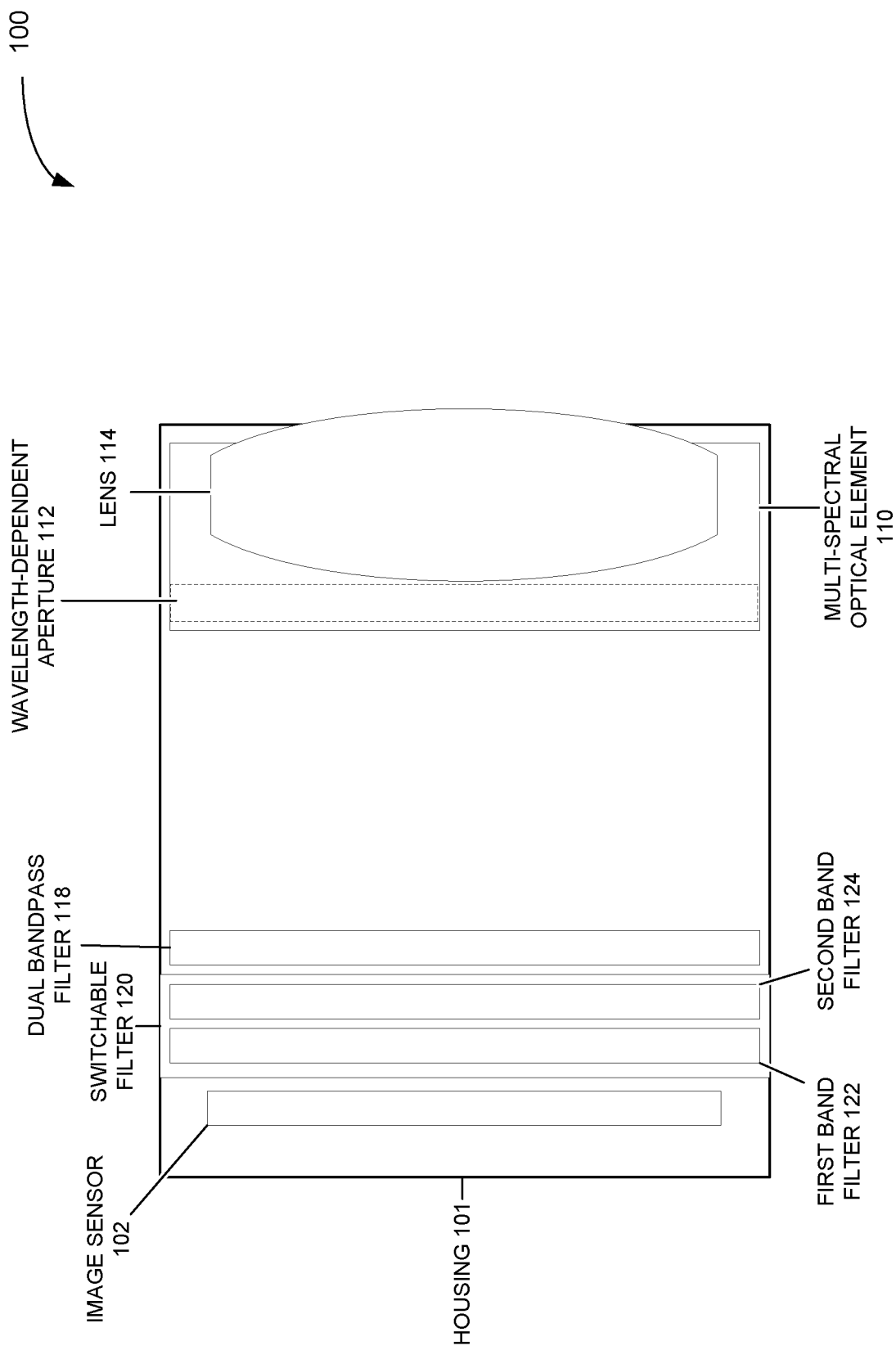

As shown in FIG. 1A, the present disclosure is directed to an optical system 100 which is configured to capture imagery in two or more spectral bands using a single optical path (e.g., light in the two or more spectral bands flows through the same lens(es), filter(s), and/or aperture(s) before eventually being detected by an image sensor 102. Compared to optical systems that use multiple different optical paths for different spectral bands, the optical system 100 may achieve various advantages. The single optical path may reduce a number of components and/or complexity of the optical device as compared to a device with multiple different optical paths for different spectral bands. For example, all of the components of the optical path may be included in a common housing 101, enabling multiple light band captures within the space of only one camera module as described above. Furthermore, the sensor device may be able to image a scene in the multiple different spectral bands from a single vantage point/view angle.

FIG. 1A shows one example of an optical system 100 with a common optical path for multiple spectral bands. The depicted components are exemplary, and the techniques of the present disclosure are applicable to a range of other systems with varying optical path components. Although the present disclosure includes examples and techniques described with regard to IR and VIS spectral bands, the techniques of the present disclosure may be applied to an optical system configured to capture any suitable plurality of spectral bands.

Optical system 100 includes a multi-spectral optical element 110. "Multi-spectral optical element" may be used herein to refer to a broadband, common-focus imaging lens or any other suitable multi-spectral optical imaging element. For example, multi-spectral optical element 110 may be configured to focus light at an image sensor plane so as to produce a modulation transfer function value that is above a predetermined threshold value for each of the first and second spectral bands for a given spatial frequency (e.g., a given spatial frequency with regard to which the modulation transfer function value is measured/computed). In other words, the multi-spectral optical element 110 may be able to achieve suitable performance for both bands at the same spatial frequency (e.g., as compared to optical systems that may only be able to achieve suitable performance for both spectral bands at different, band-specific spatial frequencies). In some examples, multi-spectral optical element 110 may produce a through-focus modulation transfer function response which is substantially overlapping, and/or has substantial common coverage at desired image plane locations, for each of the first second spectral bands. As will be described further herein, multi-spectral optical element 110 may achieve the desired modulation transfer function response by shifting the focal distance for one or both spectral bands relative to the image plane and/or object scene, and/or by achieving a different depth of field/depth of focus for the two different spectral bands. Multi-spectral optical element 110 comprises a multi-spectral lens 114 and optionally further including a wavelength-dependent aperture element 112. Multi-spectral lens 114 is shown as a simple convex lens in FIG. 1A. However, as will be shown in FIG. 1B, multi-spectral lens 114 may include a plurality of component lenses of different materials, refractive indices, etc., configured to achieve a desired focus for one or more different spectral bands. Multi-spectral optical element 110 is configured to receive and focus light in at least a first spectral band and a second spectral band via wavelength-dependent aperture element 112. Although wavelength-dependent aperture element 112 is shown as a component of multi-spectral optical element 110, alternately wavelength-dependent aperture element 112 may be separate from multi-spectral optical element 110. For example, wavelength-dependent aperture element 112 may be disposed at any suitable location in the light path for the optical system 100. Furthermore, although the present disclosure includes numerous examples in which a wavelength-dependent aperture element 112 may be used to achieve desired optical properties (e.g., to achieve a desired depth-of-field for one or more spectral bands and/or to control an acceptance ratio of light in the one or more spectral bands), it will be appreciated by those skilled in the art that wavelength-dependent aperture element 112 is optional.

The received and focused light passes through a switchable filter 120 comprising a first band filter 122 and a second band filter 124. The first band filter 122 is configured to control transmission of the first spectral band, and the second switchable filter 124 is configured to control transmission of the second spectral band. Optical system 100 may include other elements not depicted in FIG. 1A. For example, elements of optical system 100 may be protected by one or more cover glass elements (e.g., cover glass protecting image sensor 102).

Figure 1B:
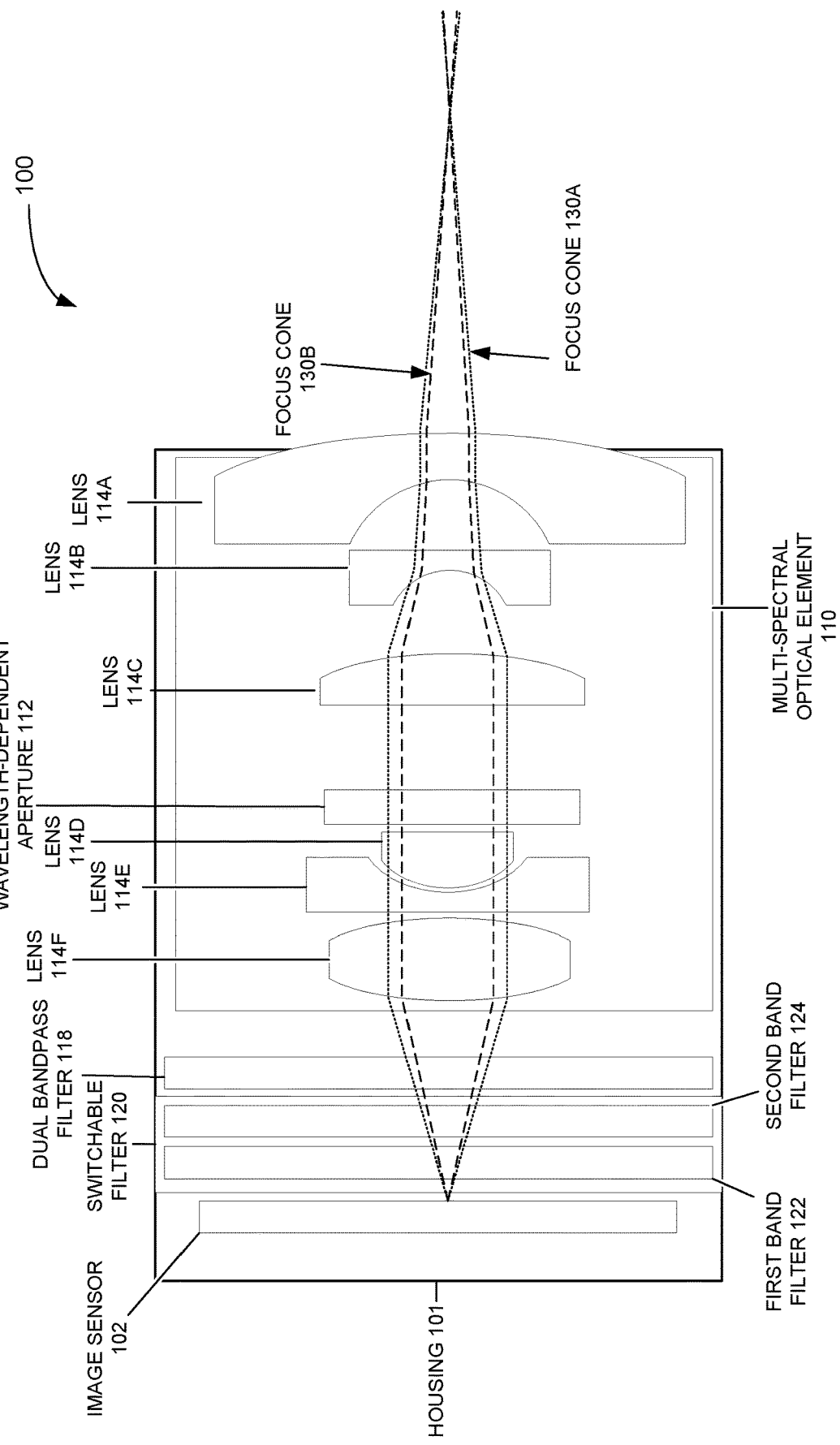

Furthermore, although optical system 100 is depicted with a single convex lens 114, multi-spectral optical element 110 and/or optical system 100 may include any suitable optical elements, e.g., convex and/or concave refractive lenses, aspheric elements, plastic lens elements, glass molded elements, Fresnel lenses, etc. Still further, the dispersion characteristics of refractive index for the various elements in optical stack may be individually selected so as to support substantially common focus across the one or more spectral bands. In some examples, as shown in FIG. 1B, multi-spectral optical element 114 may include a plurality of component lenses (e.g., lens 114A, lens 114B, lens 114C, lens 114D, lens 114E, and/or lens 114F). For example, the plurality of component lenses may include one or more different materials with different refractive indices (e.g., plastic, glass, etc.), along with one or more different optical surface profiles, configured to focus IR and VIS light at substantially the same depth relative to image sensor 102 (e.g., achieving substantially the same focus for the different spectral bands). For the case of multi-spectral optical element 114 having wide field-of-view, the maximum chief ray angle (CRA) at image sensor may include lower incidence angle than other locations within the optical stack, or in front of lens, which may provide reduced angular constraints for switchable filter placed in proximity to the image sensor plane. Further, the switchable filter air to optical-media surfaces may be optically coated with a broadband anti-reflective (BBAR) coating which provides increased efficiency for the optical stack. Further still, the switchable filters 122 and 124 may be optically bonded together, or further share at least one common substrate, so as to reduce reflection losses by reducing one or more optical media interfaces between filters, enabling the additional benefit of reducing the overall thickness of switchable filter stack. Typical substrate layers supporting liquid crystal layers included in the switchable filter stack may include optically transparent glass layers having thickness of 400 micrometers, 200 micrometers or 100 micrometers, as examples. As further examples, switchable filter stack may include 2 liquid crystal layers each layer supported between a pair of glass substrates, each pair bonded together, thus including 4 glass substrates. Alternatively, a switchable filter may include a common substrate between pairs, thus include 3 glass substrates. Further, a stack may include 4 liquid crystal layers using 8 glass substrates, or reduced to 6 glass substrates using 2 shared/common substrates, or reduced to 5 glass substrates using 3 shared/common substrates.

As shown in FIG. 1A, when included, wavelength-dependent aperture element 112 is disposed at a pupil of multi-spectral optical element 114. For example, the pupil may be disposed adjacent to multi-spectral optical element 114. As shown in FIG. 1B, the pupil for an optical system including relatively large and/or wide field-of-view lenses may be located in the middle of a stack of component lenses, e.g., wavelength-dependent aperture element 112 is disposed between lens 114D and lens 114C. In other examples, such as mobile devices, the pupil may be close to a front lens of a stack of lenses (e.g., adjacent to lens 114A), or in any other suitable location based on total optical track length constraints, form factor requirements, etc. In any case, when included, wavelength-dependent aperture element 112 is configured to admit light from the two different spectral bands with different stop sizes, thereby achieving different depth-of-field and corresponding focus cone sizes. For example, wavelength-dependent aperture may be configured to admit light from the first spectral band with a first, relatively larger physical aperture size (smaller stop size) achieving a relatively smaller depth of field with a larger focus cone 130A, while admitting light from the second spectral band with a second, relatively smaller physical aperture size (larger stop size) achieving a relatively larger depth of field with a smaller focus cone 130B. Although the present disclosure is described with regard to achieving a particular focus cone size indicating depth of field in an object scene, alternately or additionally the techniques of the present disclosure may be applied with regard to configuring an image-conjugate focus cone (e.g., depth of focus in proximity to the image sensor plane). The sizes/spatial relationships shown in FIG. 1B are not shown to scale, and any suitable configuration of optical components may be used to achieve desired imaging results. As a non-limiting example, a focus cone near an image sensor may be 20-30 degrees, corresponding to a smaller cone angle in an object scene being imaged (e.g., a larger conjugate image distance in the object scene relative to the conjugate image distance near the sensor plane).

Switchable filter 120 is electrically switched to selectively transmit light in zero, one, or both of the first spectral band and the second spectral band. As shown in FIGS. 1A and 1B, dual bandpass filter 118 may be included between multi-spectral optical element 110 and switchable filter 120. Dual bandpass filter 118 is configured to transmit light within the first spectral band and light within the second spectral band, while not transmitting light from other spectral bands. In particular, dual bandpass filter 118 is configured to filter out light in a transition region of the switchable filter including wavelengths between the two spectral bands (e.g., light with a wavelength in between the two spectral bands). The dual bandpass filter 118 is also configured to filter out light having a wavelength outside of the range spanned by both bands. For example, when the first and second spectral band are IR and VIS light, dual bandpass filter 118 may be configured to not transmit light in the 660-800 nanometer range, to not transmit light within the 660-890 nanometer range, or more generally to block transmission of light in any suitable range so as to achieve good separation between the first spectral band and second spectral band. Dual bandpass filter 118 is generally configured to remove wavelengths of light in a transition region between the bands corresponding to each of the first band filter 122 and second band filter 124. Accordingly, while the first band filter 122 and/or second band filter 124 are switched to block and/or transmit light within the two spectral bands, dual bandpass filter 118 ensures that light from the transition region and/or light from other spectral bands is not undesirably transmitted through the filters. For example, dual bandpass filter 118 may prevent the transmission of light through switchable filter 120 when switchable filter 120 is in an intermediate state (e.g., during a transition time during which the switchable filter 120 switches between transmitting and blocking light within one or both of the spectral bands). As a non-limiting example, dual bandpass filter 118 may be implemented as a dual bandpass dichroic coating. Optionally, dual bandpass filter 118 may be a glass panel with a dual bandpass feature (e.g., dual bandpass dichroic coating) on one side and a broadband anti-reflective coating on the other side. In general, dual bandpass filter 118 cleans up, 'tightens' or 'sharpens' the bandwidth of each band so as to reduce cross-talk of the switchable band transition region, which is typically less sharp or has less steep transition or may have cross-talk between bands in that region, improving the 'purity' of each band when used in combination with the switchable filter.

The components of optical system 100 are a schematic representation of possible components in a light path for the optical system, and are not shown to scale. Furthermore, the arrangement of components shown in FIG. 1A is one exemplary arrangement, and the techniques described herein may be applied generally to any optical system including a multi-spectral optical element 110 and/or a switchable filter 120. For example, the multi-spectral optical element 110 may include different components as compared to FIG. 1A or 1B, and when included wavelength-dependent aperture element 112 may be disposed at any suitable pupil location.

Furthermore, the dual bandpass filter 118 may be located elsewhere (e.g., located between switchable filter 120 and image sensor 102, or adjacent to wavelength-dependent aperture 112). Optical system 100 may include alternate and/or additional components not shown in FIG. 1A. For example, optical system 100 may include one or more illuminators (e.g., camera flash) configured to provide illumination in one or both spectral bands. As an example, when the first spectral band includes IR light, optical system 100 may include an IR illuminator configured to illuminate a scene with IR light.

Image sensor 102 is configured to receive light in two different spectral bands (e.g., IR and VIS). For example, image sensor 102 may include one or more layers of spatially arranged sensors for light in the first band and light in the second band (e.g., IR and RGB sensors), configured to detect a spatial pattern of received light. However, although image sensor 102 may be able to detect light in both spectral bands with a high sensitivity, it may be desirable to image the spectral bands separately. For example, some image sensors may have a reduced fidelity of one or both bands when illuminated by both bands (e.g., due to interference between the two bands). For example, the sensors for light in the first band may partially and/or weakly detect some light from the second band (e.g., an infrared sensor may detect some red light). Nevertheless, high-quality images in each band may be detected by imaging the bands separately, by using switchable filter 120 to selectively transmit one of the spectral bands at a time. Since red, green, and blue pixels of a typical RGB image sensor have similar responsivity to IR at 850 nm or 940 nm, thus similar infrared quantum efficiency, all of the image sensor pixels may be used to support high resolution for both RGB and IR images, without sacrificing resolution as with the case of using RGB-IR image sensors which have a dedicated IR pixel that cannot be used for RGB frame captures.

Switchable filter 120 may be controlled in coordination with image sensor 102 to expose image sensor 102 to one or both of the first spectral band and the second spectral band, for example by configuring one or both of the first band filter 122 and the second band filter 124 to transmit or not transmit light in their respective spectral bands. For example, switchable filter 120 may be configured to work as an electrically-controlled shutter configured to expose image sensor 102 briefly to incoming light in one or both spectral bands. More generally, switchable filter 120 may be controlled by any suitable control driver, for example, by software and/or hardware associated with optical system 100. In some examples, the control driver may be configured to synchronize an "on" and "off" filter state of each of the first band filter 122 and second filter band 124 with a camera frame trigger, e.g., to rapidly modulate transmission of light in the first spectral band and the second spectral band so as to capture photographic images. Accordingly, one or both of the spectral bands may be imaged simultaneously and/or in quick succession.

Switchable filter 120 may be described herein as transmitting light whenever it transmits a sufficient proportion of received photons such that the optical system 100 achieves a desired quantum efficiency or other appropriate metric with regard to sensor 102. For example, switchable filter 120 may be described as transmitting light in a spectral band when it transmits 80% of received photons in that spectral band. In other examples, switchable filter 120 may be described as transmitting light in a spectral band when it transmits 40% of received photons in that spectral band. Similarly, switchable filter 120 may be described as not transmitting light whenever it blocks the transmission of at least a sufficient proportion of received photons, such that the optical system 100 does not spuriously detect photons from the spectral band when the filter is in a non-transmissive state. For example, switchable filter 120 may be described as not transmitting light in a spectral band when it blocks the transmission of at least 80% of received photons in that spectral band.

Switchable filter 120 may be based on any suitable state-of-the-art and/or future optical filtering technologies. For example, each of the first band filter 122 and second band filter 124 may include an electronically-switched liquid crystal filter. For example, the electronically-switched liquid crystal may be a cholesteric-type liquid crystal. In some examples, the switchable filter works as a switchable wavelength-dependent mirror. For example, a cholesteric-type liquid crystal may be tailored to a specific wavelength band with a high transmission efficiency when in a transmit mode. Further, a cholesteric-type liquid crystal switchable filter may be tailored to reject light via specular reflection, thus acting as a switchable mirror. As an example, a KENT OPTRONICS™ switchable mirror may achieve >80% efficiency of photon transmission in the transmit mode. It is believed that a switchable mirror filter may reflect light away from image sensor 102 in a more controlled and predictable fashion, thereby increasing a signal to noise ratio of the sensor relative to other filtering technologies. Contrast loss due to scattering may be reduced due to the reflections being specular rather than random, since reflections may be directed away from image sensor by design. Further, a switchable mirror type liquid crystal switchable filter may be designed to support the full visible band or the full IR band, by adjusting the wavelength response using additives to adjust the molecular spacing. thus simplifying the optical stack of filters required to switch between bands. Nonetheless, in other examples, the switchable filter may include other liquid crystal technologies configured to diffuse, absorb, polarize, and/or reflect some or all of the received light in a wavelength-dependent so as to modulate the transmission of the light. It is believed that electronically switched liquid crystal filters may achieve advantages as compared to other filters (e.g., mechanical filter or rotary filter), for example due to reduced noise and/or wear from moving mechanical parts.

Figure 1C:
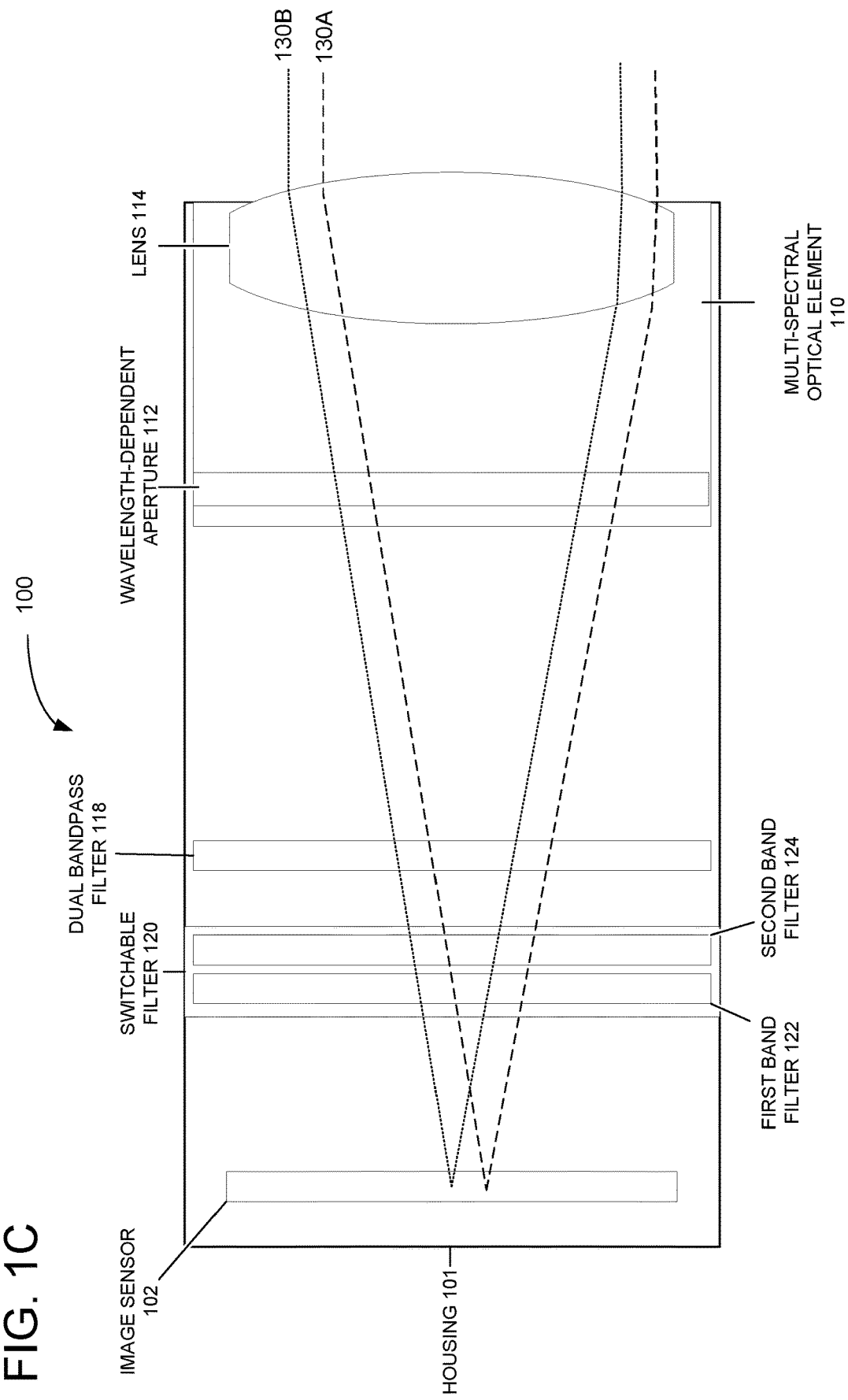

FIG. 1C shows a simplified depiction of the optical system 100. As with FIG. 1A, multi-spectral optical element 110 is shown in a simplified form including a lens 114 and a wavelength-dependent aperture element 112. However, multi-spectral optical element 110 may omit wavelength-dependent aperture element 112 and/or include different optical components, e.g., multiple lenses as shown in FIG. 1B. The elements in FIG. 1C are not shown to scale. More generally, any suitable optical components as shown in FIG. 1A-1B may be disposed in any suitable arrangement.

In any case, as shown in FIG. 1C, switchable filter 120 may be configured to transmit light in both of a first spectral band 130A (e.g., IR light) and a second spectral band 130B (e.g., VIS light). The light path and incidence angles shown for light in the first spectral band 130A and light in the second spectral band 130B are a schematic representation of potential light paths through the optical system 100, not shown to scale.

As shown, the light is received and focused via lens 114 and passes through wavelength-dependent aperture 112 of multi-spectral optical element 110. Then, the light in both of the first spectral band 130A and second spectral band 130B passes through switchable filter 120 as both first band filter 122 and second band filter 124 are set to transmit light in their respective spectral bands.

Accordingly, switchable filter 120 may be operated to selectively transmit light in one of the two spectral bands. In an example, switchable filter 120 is configured to selectively filter received light in the first spectral band in a first mode and in a second mode. In the first mode the switchable filter transmits light in the first spectral band and in the second mode the switchable filter does not transmit light in the first spectral band. For example, as shown in FIG. 1C, the switchable filter 120 is configured to transmit light in both spectral bands, i.e., the switchable filter is configured in the first mode wherein the first band filter 122 is set to transmit light. In this example, in the first mode the switchable filter is set to also transmit light in the second spectral band.

In some examples, the switchable filter is further configured, in the first mode, to not transmit light in the second spectral band while transmitting light in the first spectral band, and in the second mode, to transmit light the second spectral band while not transmitting light in the first spectral band. For example, in FIG. 1D, in the first mode, the switchable filter 120 is still set to transmit light in the first spectral band, but the second band filter 124 is set to block incoming light in the second spectral band. Therefore, the switchable filter 120 is configured to transmit light in the first spectral band, while not transmitting light in the second spectral band.

In another example, in FIG. 1E, the switchable filter 120 is configured in the second mode so that it does not transmit light in the first spectral band. In particular, the first band filter 122 is set to block light in the first spectral band. As shown, the second band filter 124 is set to transmit light in the second spectral band. Although not shown in FIG. 1E, in some examples, both of the first band filter 122 and the second band filter 124 may be set to block incoming light, so that the switchable filter 120 does not transmit light in either of the first spectral band or the second spectral band.

More generally, the switchable filter 120 may be set into any suitable state with regard to transmitting or not transmitting each of the first spectral band and the second spectral band, e.g., transmit neither spectral band, transmit first spectral band, transmit second spectral band, or transmit both spectral bands.

Figure 2A:
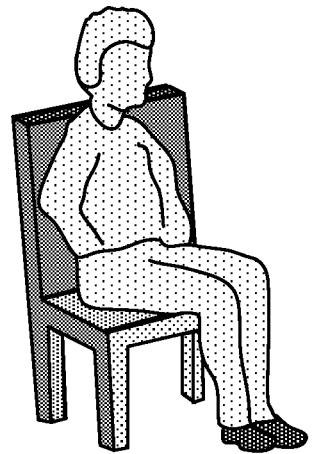
FIGS. 2A-2D depict exemplary image capture modes for a switchable optical sensor system.

In some examples, the multi-spectral optical element, the switchable filter, and the sensor device are operated to selectively image light in one of the first spectral band and the second spectral band while not imaging light in the other spectral band. For example, FIG. 2A shows a schematic depiction of an image captured using a first spectral band wherein the switchable filter is set to transmit the first spectral band, and block the second spectral band. For example, the first spectral band may be IR and the second spectral band may be VIS. Based on distance-dependent illumination of a subject in the IR spectral band (e.g., due to roll-off proportional with the square of the radial distance from illuminator), the closer portions of the subject (e.g., the person sitting in the chair) appear brighter, relative to the further portions (e.g., the chair). Further, note that FIG. 2A, allowing IR transmission, may be captured with or without onboard IR illumination. The IR flash timing of an IR illuminator may be synchronized so as to capture a scene illuminated with IR light. Alternatively, the IR illuminator may be switched off during capture in order to provide an IR ambient frame capture, which may be used in ambient cancellation of IR in the scene in order to improve IR image quality, reducing various effects such as shadows and side-lighting issues for images intended for biometric algorithms and DNNs.

Figure 2B:
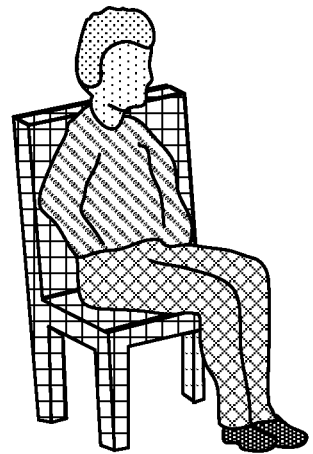

As another example, FIG. 2B shows a schematic depiction of an image of the same scene captured using a second spectral band, for example, where the switchable filter is set to block the first spectral band (IR) and to transmit the second spectral band (VIS). As depicted, different portions of the subject have different detected color and/or intensity (e.g., as detected by a red-green-blue (RGB) sensor).

Figure 2C:
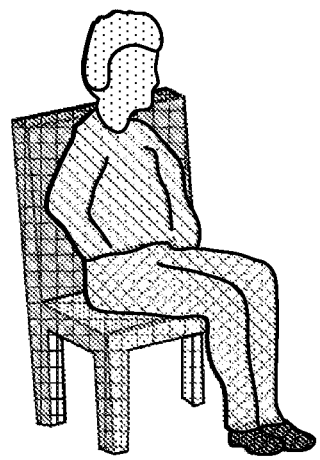

As another example, FIG. 2C shows a schematic depiction of an image of the same scene captured using both spectral bands at the same time, e.g., where the switchable filter is set to transmit both the first spectral band and the second spectral band, so that light from both spectral bands pass the filter. The image includes details from the illumination by both spectral bands, e.g., depth-dependent illumination in IR and color/intensity in VIS.

Figure 1D:
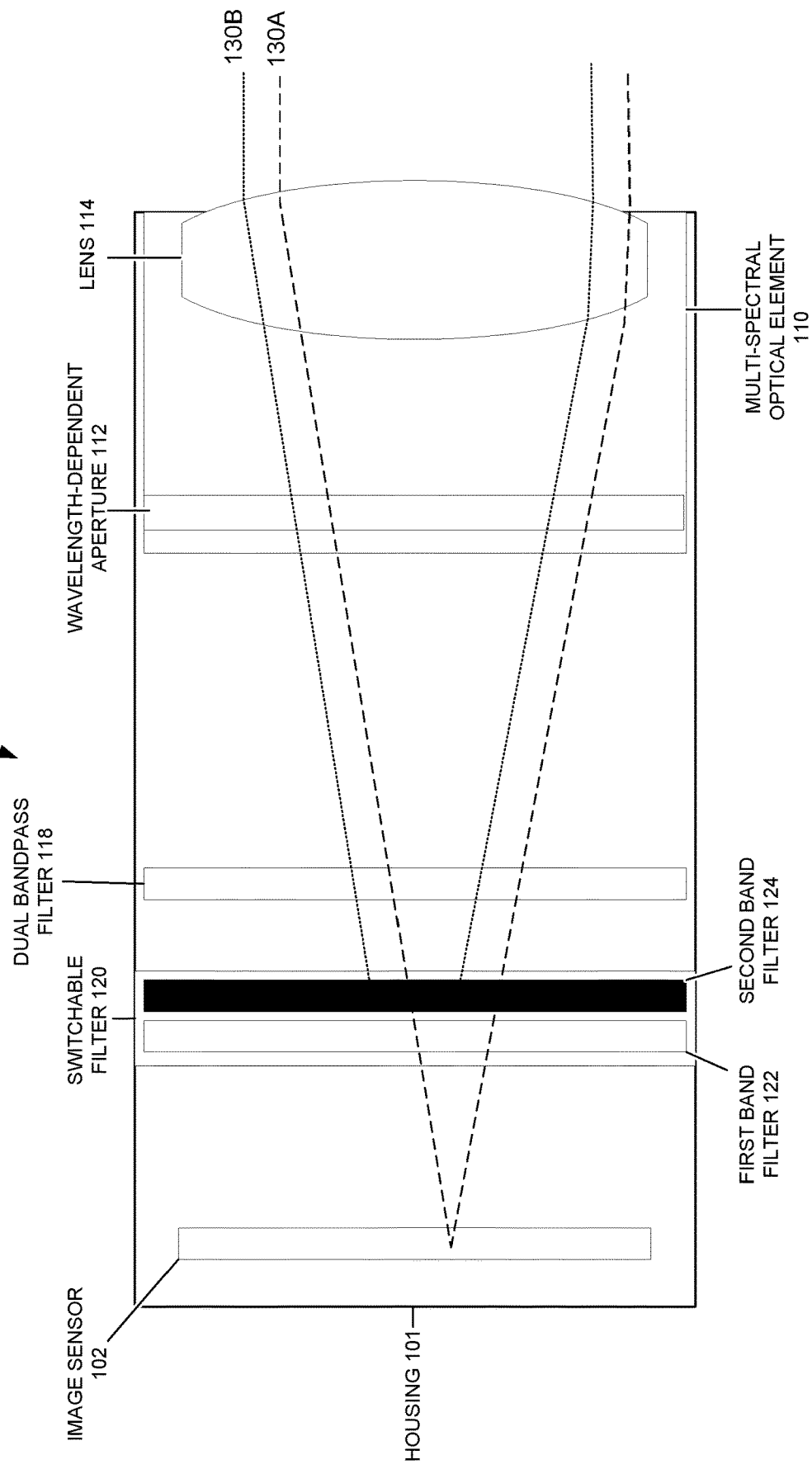
Figure 2D:
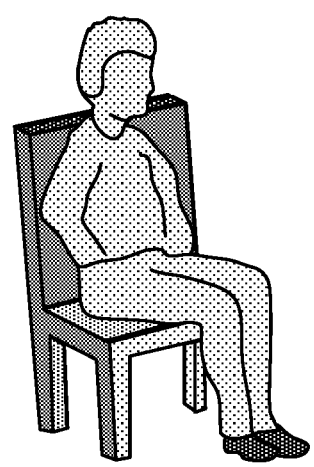

In some examples, an image captured using both spectral bands may be post-processed along with an image captured using just one of the spectral bands, in order to computationally infer an image that would result from illumination with the other one of the spectral bands. For example, the switchable filter may be set to transmit both spectral bands to capture a dual-band image similar to that shown in FIG. 2C, then set to block the first spectral band so as to capture a VIS image similar to that shown in FIG. 2B. Then, a difference between the two images may be computed to obtain an inferred IR image as shown in FIG. 2D. The inferred IR image may not be as accurate or as of as high a fidelity when compared to a single-band IR image in FIG. 2A. Nevertheless, computing the single-band IR image from the difference between FIG. 2C and FIG. 2B may allow a simpler optical system design. For example, although the present disclosure includes examples of switchable filters including two separate band-specific filters, the techniques of the present disclosure may be similarly applied for an optical system including a single band-specific filter configured to transmit or not transmit the first band. As an example, switchable filter 120 may include only first band filter 122 while omitting second band filter 124. Accordingly, in this example switchable filter 120 would be operable in a first mode configured to transmit the first spectral band (while also transmitting the second spectral band, as shown in FIG. 1B), and in a second mode configured to not transmit the first spectral band (while transmitting the second spectral band, as shown in FIG. 1D). Accordingly, FIG. 2C depicts an image obtained in the first mode; FIG. 2B depicts an image obtained in the second mode; and FIG. 2D depicts an inferred image computed by a difference between FIG. 2B and FIG. 2C.

Although a common optical path with a switchable filter may be used as described herein to capture imagery in multiple different spectral bands, any two different spectral bands will generally have different focal distances where image quality is optimal, as a wavelength-dependent property of the interaction of the received light in the two different spectral bands with the optical system (e.g., based on a wavelength-dependent refraction index of a material of lens 114). For example, as shown in FIG. 1A, multi-spectral optical element includes a multi-spectral lens 114 configured to receive and focus light in both the first spectral band and the second spectral band. For a given configuration/setting of the optical system, there may be a first focal distance of optimal quality for the first spectral band and a second, different focal distance for the second spectral band. For example, the first focal distance may be defined as a z-depth having a maximal value of the MTF curve for the first spectral band (e.g., a peak of the MTF curve). Similarly, the second focal distance may be defined as a z-depth having a maximal value of the MTF curve for the second spectral band.

For example, a lens material for refracting IR and VIS light will typically achieve a different optimal focal length for the IR light compared to the VIS light, due to dispersion of the refractive indices of the elements in the optical stack of the lens. Accordingly, returning briefly to FIG. 1A, a distance between image sensor 102 and lens 114 necessarily cannot be exactly identical to both of the different preferred focal distances for the different spectral bands. Based on such disparity between focal distances, image sensor 102 may not capture satisfactory images for both bands unless a depth of field for one or both spectral bands is sufficiently large. However, in general, increasing a depth of field for an image is accomplished by using a smaller aperture or higher F-number, which reduces the amount of light illuminating the sensor, may limit spatial frequency response (SFR) or resolve of the image, or may be otherwise undesired. For example, generally increasing depth of field may be unsuitable for some imaging applications (e.g., capturing a photograph that is focused on a particular foreground subject). Further, generally increasing depth of field by stopping down the lens aperture may limit resolution capability, or SFR, of an imaging lens design.

Accordingly, the multi-spectral optical element 110 of the present disclosure is configured to achieve a different depth of field for each of the first spectral band and the second spectral band. By selectively increasing the F-number and resulting depth of field for one of the two spectral bands in a wavelength-dependent fashion, multi-spectral optical element 110 may be configured to achieve satisfactory imaging in both spectral bands at the same focal distance. Furthermore, since the F-number also affects the amount of light that illuminates the sensor, the multi-spectral optical element 110 of the present disclosure may also be configured to achieve a desired acceptance ratio of light from the first spectral band as compared to light in the second spectral band. In some examples, different F-numbers for different spectral bands may be achieved through a suitably configured wavelength-dependent aperture element. Accordingly, a wavelength-dependent aperture element may be used to achieve a desired depth of field and/or acceptance ratio for light from the two spectral bands.

Figure 3A:
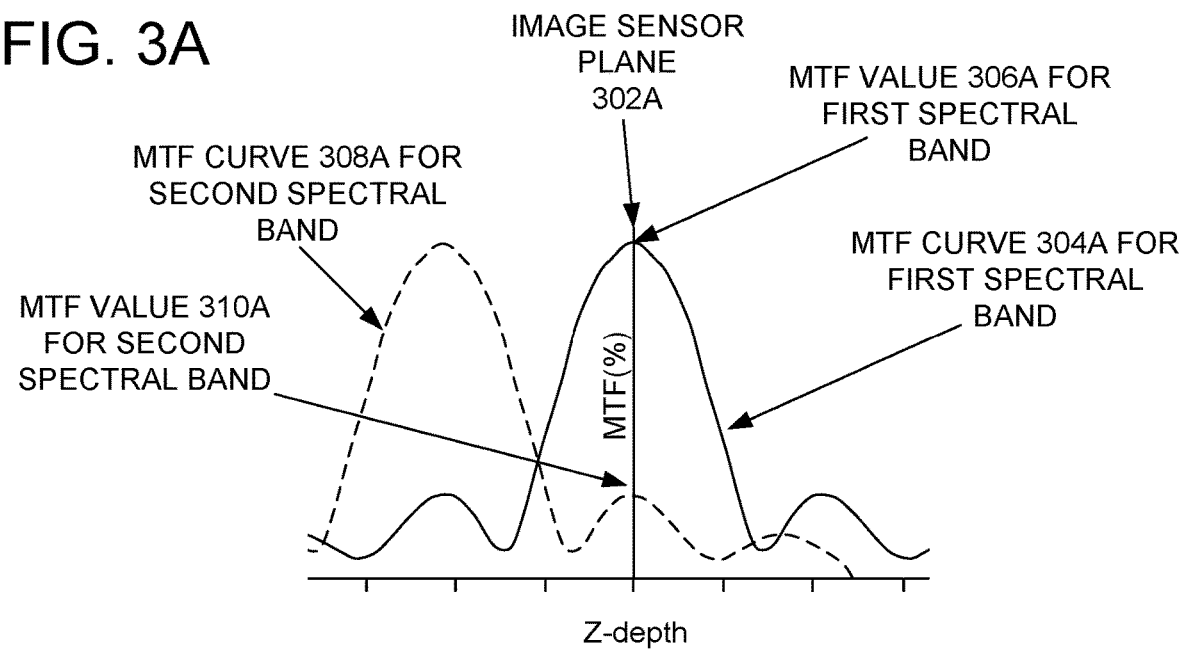
FIGS. 3A-3D show exemplary through-focus modulation transfer function curves for optical elements.

FIG. 3A shows an exemplary through-focus modulation transfer function (MTF) curve chart for an exemplary optical system, e.g., including a camera lens and other optical components. The x-axis of the chart indicates a Z depth of different focal distances relative to the image sensor plane (e.g., the intersection with the y-axis of the chart at y=0 indicates a Z depth of 0, i.e., focus exactly at the image plane). The y-axis of the chart indicates a through-focus MTF value, which is a percentage of a normalized value of contrast modulation between 0 and 1. For example, for a through-focus MTF curve representing a given spatial frequency response (SFR), a higher MTF value (e.g., closer to 1) indicates a higher contrast modulation for that given SFR, thus optical resolve and/or sharpness of the focused light at a corresponding z-depth for the given spatial frequency represented by that through-focus MTF curve.

The modulation transfer function curve chart shows two curves indicating a quality of focus and/or related quality characteristics for different spectral bands, at different focal distances from a reference point (i.e., distance between lens and related optics and the image sensor plane). The graphs of FIGS. 3A-3D are not shown to scale, but instead illustrate general relationships that may be observed for a given optical system based on through-focus MTF curves for that system. A higher point on the curve indicates a higher quality of focus for the spatial frequency represented by that through-focus MTF curve, etc. An optical system can achieve a relatively higher performance (e.g., with regard to achieving good modulation contrast, thus focus, optical resolve, and/or sharpness) with regard to a spectral band if a sensor of the optical system is placed at or near a maximal point on a corresponding MTF curve. The modulation transfer function measures a magnitude response of an optical system to sine wave illumination gradients of different frequencies, thereby measuring the sensitivity of the optical system in the spatial frequency domain. The techniques of the present disclosure may be applied using MTF curves and/or any other optical function of focal distance, irrespective of the exact units and graphical representation. The through-focus MTF curve shown here is a slice orthogonal to such an MTF vs spatial frequency chart, where the slice or through-focus MTF profile is represented by a slice at a given spatial frequency. Profiles taken at different spatial frequencies may represent through-focus MTF curves for each different given spatial frequency.

The through-focus MTF modulation curve chart has an z-axis showing a distance from an image sensor plane 302A disposed at an optimal focal distance for the first spectral band, as denoted by the center point of the MTF curve 304A for the first spectral band which has a maximal MTF value 306 for the first spectral band. The Y-axis shows modulation performance of the optical system along various back focal length z distances in proximity to the image sensor plane, e.g., higher points on the Y axis represent improved resolve of the optical system. Modulation performance may refer to any suitable measurement of the responsiveness and/or sensitivity of the optical system to detecting light at different spectral frequencies, different spatial distributions and/or resolution, etc.

FIG. 3A represents a configuration in which the image sensor is placed at an image sensor plane 302A that is the optimal focal distance for the first spectral band (e.g., the IR band). It may be desirable to have various levels of MTF performance in an optical system, e.g. >30% MTF (i.e., at least 30% of a normalized maximal MTF value) for one or both bands, or >50% MTF for one or both bands. Since focus may shift in z due to working distance of objects in scene for a fixed-focus system, focus of MTF curve 304A may be placed at image sensor plane 302A in order to support a working range requirement of a camera system. In some examples, if one or both MTF curve(s) cannot meet such minimum MTF requirement, the optical system may only be focused within a narrow working range. Further, for a given spatial frequency, if the z shift between focus peak responses are too far apart, such that width of through-focus curve is substantially smaller than z distance between peak responses, one MTF curve may not support acceptable modulation at that given spatial frequency represented by through-focus MTF curve, and may only have overlap for lower spatial frequency through-focus MTF response curves.

The chart also includes a second MTF curve 308A for the second spectral band (e.g., the VIS band). However, based on the different optimal focal distance for the second spectral band, the MTF curve 308A for the second spectral band is displaced relative to the first. Its highest central value is not located at the image sensor plane 302A. Instead, the MTF value for the second spectral band at the image sensor plane 302A (i.e., value 310A) indicates that sensitivity for the second band at the image sensor plane is substantially lower than its optimal value—i.e., the value that would occur for the second band if the image sensor plane were moved to the focal point of the second spectral band at the center of its MTF curve. By moving the image sensor plane to different locations, the MTF curve values change for that plane location, thereby obtaining different contrast modulation at the spatial frequency represented by through-focus MTF curve, for the two spectral bands as indicated by the intersect of the MTF curves with the Y axis image plane location. However, any improvement to the MTF value 310A for the second spectral band (e.g., to improve focus) would necessitate shifting the image plane so as to lower the MTF value 306A for the first spectral band.

The z width, or depth of focus in proximity to image sensor plane, of the through-focus MTF curve is influenced by the width of depth of field in object scene for an optical system with regard to a spectral band. As shown in FIG. 3A, the two spectral bands have similar width MTF curves. For example, the optical system may have the similar depth of focus for each spectral band (e.g., F-number of 1.4).

As an example, FIG. 3A may represent MTF response curves for sensitivity of an optical system to a first spectral band comprising IR light and a second spectral band comprising VIS light. Accordingly, as depicted, the optical system is optimally sensitive to the IR light. However, the optical system may have impaired frequency sensitivity to the VIS light (e.g., resulting in poor focus/blurring for at least one of the bands).

Figure 3B:
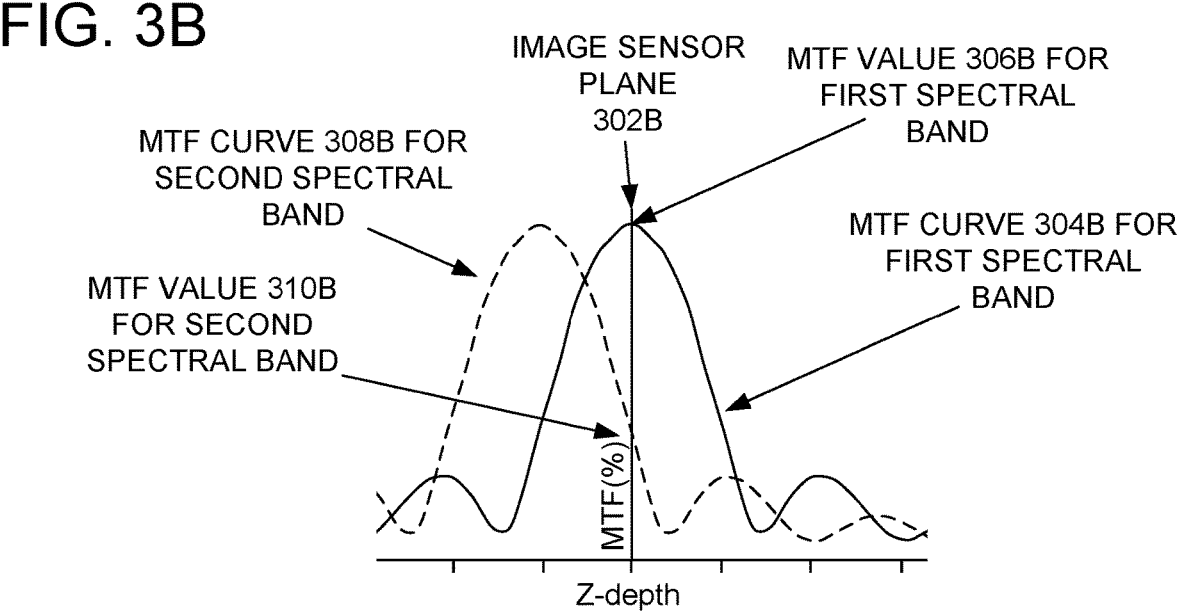

In some examples, the multi-spectral optical element may be suitably configured so as to move the center location of the MTF curve for one or both of the spectral bands, thereby moving the peaks of the spectral bands closer together, as shown in FIG. 3B. For example, the multi-spectral optical element 110 of FIG. 1B may accomplish similar focal distances for two different spectral bands by using suitable component lenses configured to achieve similar focal distances for both bands. Accordingly, as shown in FIG. 3B, the MTF value 310B of the second spectral band is relatively increased as compared to FIG. 3A.

In other examples, a multi-spectral optical element may be unable to achieve suitable focus for both bands merely based on shifting the focal distance for one or both spectral bands. However, even though it may not be possible to move the center location of the MTF curve for the second spectral band sufficiently close to the center location of MTF curve for the first spectral band, it may be possible to configure the multi-spectral optical element to adjust the width of one or both MTF curves. The width of an MTF curve for a spectral band depends on the depth of field in object scene, or depth of focus at sensor, for that spectral band, with a higher depth of focus (e.g., higher F-number or smaller aperture) resulting in a wider MTF curve.

Figure 3C:
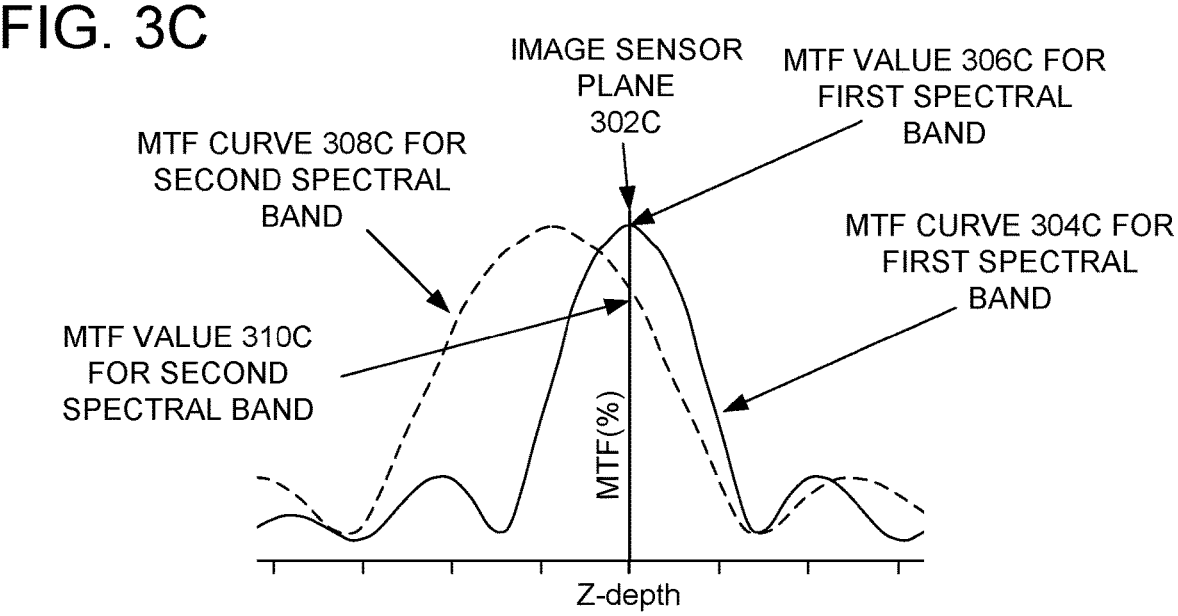

By increasing the width of one or both MTF curves, it may be possible to find a location for image sensor plane that achieves satisfactory performance with regard to both spectral bands, for example an MTF curve value exceeding a predefined quality threshold. As depicted in FIG. 3C, although the center location of MTF curve 308C is not as close to the center of MTF curve 304C, the MTF curve 308C for the second spectral band may be widened (relative to FIG. 3A) by increasing a depth of field for the second spectral band, by using a smaller aperture (e.g., a larger F-number, such as 1.8) for the second spectral band. The smaller aperture and widened depth of field result in a wider through-focus MTF curve 308C for the second spectral band, thereby resulting in an increased MTF response value 310C for the second spectral band at the image sensor plane 302C (i.e., exceeding the predefined quality threshold), even though the optimal focal distance for the first and second band (e.g., as indicated by the center of the MTF curves) is not changed. However, increasing F-number may reduce spatial frequency response of an optical system, e.g. reducing aperture by a factor of 2 may reduce the spatial frequency response (SFR) of an optical system by 50%, so there is a tradeoff. Accordingly, as shown in FIG. 3B, when possible, a multi-spectral optical element is desirably configured to achieve similar focal distances for both spectral bands, without requiring substantial widening of the depth of field for either spectral band.

Nevertheless, by widening the MTF curve 308C for the second spectral band, to the optical system may provide improved/sufficient performance for both spectral bands at any offset location between the peaks of the two MTF curves—e.g., exceeding a threshold. Accordingly, adjusting the depth of field for the second spectral band and thereby widening the MTF curve 308C may permit image sensor plane 302C to be moved to a variety of different locations while still achieving good imaging quality for both spectral bands. Due to the increased width of through-focus MTF curve 308C, the image sensor plane 302 may be placed at a location that achieves sufficiently high values for MTF curve 304C for the first spectral band and for MTF curve 308C for the second spectral band. For example, image sensor plane 302C may be located at the peak of the MTF curve 304C for the first spectral band as shown in FIG. 3B, or shifted to the left to be closer to the peak of MTF curve 308C for the second spectral band. In some examples, the multi-spectral optical element is configured to image the received light onto the sensor (e.g., to project the light in a focused manner onto the sensor), with focus or another setting selected to cause the sensor to be disposed at one of the optimal MTF band locations, i.e., at either the (1) the first focal distance for the first spectral band, or (2) the second focal distance for the second spectral band. For example, as shown in FIGS. 3A-3C, the sensor is disposed at the first focal distance for the first spectral band (i.e., optimal performance location for that band). In other words, relative to the lens, the image sensor is disposed at the ideal focal distance for the first spectral band. In FIG. 3A-3B, the multi-spectral optical element has a similar depth of focus for both spectral bands (e.g., corresponding to an F-number of 1.4). In FIG. 3C, the multi-spectral optical element has a first depth of focus for light in the first spectral band, and the multi-spectral optical element has a second, larger depth of focus for light in the second spectral band. Such different depth of focus may be controlled by use of different aperture size between bands using a wavelength dependent aperture, however, in some examples, the widened response may suffer in spatial frequency response. In other examples, the image sensor may be disposed at the ideal focal distance for the second spectral band, or in between the ideal focal distance for the first spectral band and the ideal focal distance for the second spectral band.

Figure 3D:
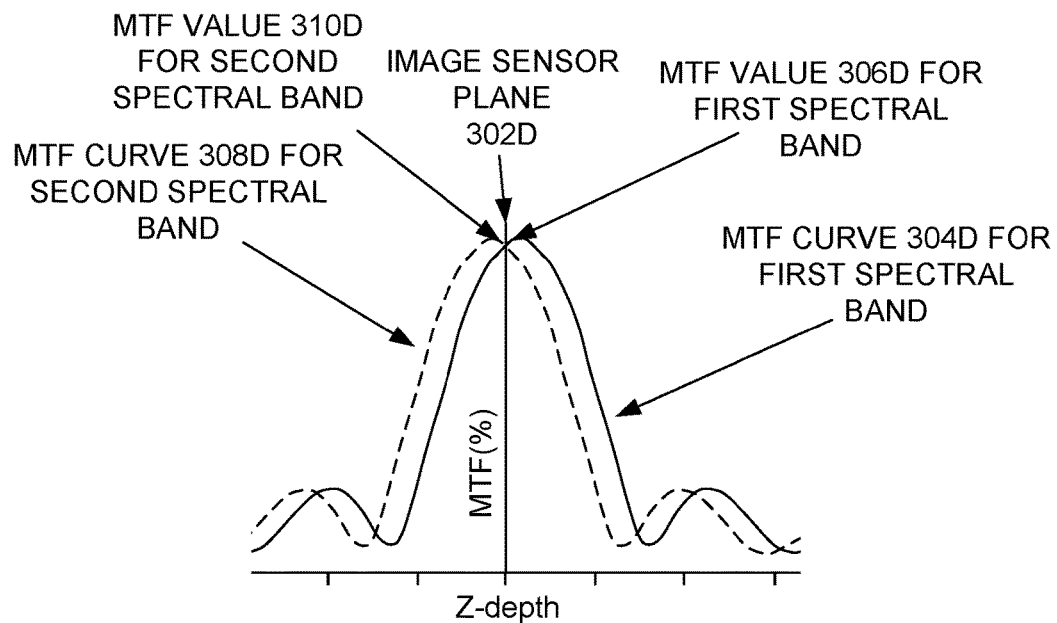

FIGS. 3A-3B show an image sensor plane disposed at a center of the MTF curve for the first spectral band. However, in some examples, the image sensor plane may be disposed in between the center of the two MTF curves, as shown in FIG. 3D, thereby achieving suitable focus for both spectral bands. FIG. 3D illustrates 'moving' peak responses to substantially overlap, e.g., by using a multi-spectral optical element (e.g., multi-spectral imaging lens) having substantially overlapping, or common, through-focus focus peak between bands. As shown in FIG. 3D, the response of both bands for the same SF through-focus MTF profile may be substantially overlapping, thus the optical system may maintain sufficient optical resolve imaging capability for both bands.

As shown in FIGS. 3A-3D, an optical system may be designed to achieve a sufficient frequency response in each spectral band (e.g., by adapting a system that behaves similarly to the depiction in FIG. 3A so as to shift one of the focal distances for a spectral band as shown in FIGS. 3B and 3D, or to widen a depth of field for one of the spectral bands, as shown in FIG. 3C). Since the multiple spectral bands have different optimal focal distances, achieving sufficient frequency response for each spectral band may require a compromise, e.g., increasing depth of field for one or both of the spectral bands. Although the above example is described with regard to MTF curves and IR and VIS spectral bands, the techniques described herein may be applied to achieve suitable frequency response for any choice of frequency bands (e.g., y UV, visible, infrared), and/or using any suitable measurement of frequency response (e.g., optical transfer function curve instead of modulation transfer function curve).

In some examples, the image sensor plane 302 achieves good sensitivity for both spectral bands. For example, when MTF curve 308B for the second spectral band is shifted closer to MTF curve 304B for the first spectral band as shown in FIG. 3B, values for both MTF curves may be sufficiently high (e.g., >30% MTF) at the image sensor plane 302B. Similarly, when MTF curve 308C is for the second spectral band widened to have a substantial overlap with MTF curve 304C for the first spectral band, as shown in FIG. 3C, values for both MTF curves may be sufficiently high (e.g., >50% MTF), although the widened response band may suffer in spatial frequency response, as the widened through-focus MTF curve represents a reduced SF. Although FIGS. 3A-3D show examples in which the MTF curve for one spectral band is shifted or widened, more generally the MTF curves for both spectral bands may be shifted and/or widened to achieve desired focus for both spectral bands. Accordingly, the image sensor plane may be placed at any suitable location that has at least a pre-defined threshold value for both MTF curves, e.g. >30% MTF or >50% MTF.

In some examples, widening one MTF curve may enable placement of the sensor plane at a location that achieves sufficient values for both MTF curves. For example, as shown in FIG. 3C, the widening of MTF curve 308C for the second spectral band may result in suitable locations for an image sensor plane (e.g., anywhere between the respective optimal points for each band). In some examples, widening the MTF curve for one spectral band may result in a sufficient MTF value for that spectral band, at the optimal focal distance for the other spectral band. For example, as shown in FIG. 3C, the image sensor plane 302C may capture acceptable-quality images for both spectral bands when placed at the optical focal distance for the first spectral band, while sacrificing optical resolve, or spatial frequency response, for only one band (e.g., at the peak of MTF curve 304 for the first spectral band).

In other examples, the image sensor plane may be shifted away from the optimal focal distance for the first spectral band (e.g., shifted relative to the X-axis), while not being shifted all the way to the optimal distance for the second spectral band. For example, the image sensor plane may be disposed at a distance of less than 10 microns from the first focal distance for the first spectral band (e.g., shifted slightly to the left on the X-axis), while achieving good performance for the second spectral band. In some examples, image sensor plane is shifted less than 5 microns from the first focal distance towards the second focal distance.

The image sensor plane may be shifted any suitable distance from the first optimal focal distance towards the second optimal focal distance so as to achieve sufficient imaging quality for both spectral bands. In some examples, the distance is less than 20% of a width of a through-focus modulation transfer function curve for the first spectral band (e.g., less than 20% of a width of the first peak of the curve). In some examples, the distance is less than 10% of the width of the through-focus modulation transfer function for the first spectral band. In other words, widening the MTF curve for the second spectral band may enable acceptable imaging of the second spectral band by the image sensor with some impact on spatial frequency response of second band, with minimal or no compromise to quality of imaging of the first spectral band.

In order to achieve different F-numbers for the first spectral band and the second spectral band as shown in FIG. 3C, a multi-spectrum optical element may optionally include a wavelength-dependent aperture element (e.g., wavelength dependent aperture element 112 as shown in FIG. 1A). Accordingly, FIGS. 4A-4B depict exemplary wavelength-dependent aperture elements. Multi-spectral optical element 110 is configured to receive and focus light via the wavelength-dependent aperture element.

The wavelength dependent aperture element may include a patterned dichroic filter 400 as shown in FIG. 4A and/or a filter stack 400' as shown in FIG. 4B. The wavelength-dependent aperture element generally includes an external region configured to transmit one of the first spectral band and the second spectral band, and an internal region configured to transmit both of the first spectral band and the second spectral band. For example, the larger external ring may be configured for IR transmission only with the central region transmitting VIS and IR light. The internal region may be a central circular region and the external region may be a concentric annular region surrounding the central circular region. By transmitting both bands within a relatively central smaller region, and transmitting just the first band within the central and surrounding annular regions together, the wavelength-dependent aperture element attains a smaller aperture for the second band relative to the first band. Accordingly, the wavelength-dependent aperture element attains a higher depth-of-field for the second band, suitable for widening the through-focus MTF curve for the second band as described above with regard to FIG. 3B.

FIG. 4A shows a patterned dichroic filter 400 that comprises a transparent medium (e.g., glass or plastic) with dichroic surface coatings configured to control transmittance of light in the two spectral bands. As an example, patterned dichroic filter 400 may include an internal dual bandpass zone 402 configured to transmit both of the first spectral band and the second spectral band. The internal dual bandpass zone 402 may be configured with any suitable dichroic coating configured to transmit both spectral bands (e.g., with a dichroic coating configured to reflect light not within these spectral bands). Patterned dichroic filter 400 further includes an annular first-band only bandpass zone 404, with a dichroic coating configured to transmit only the first spectral band. Patterned dichroic filter 400 further includes a max stop 406 configured to block all incoming light, e.g., acting as an aperture for the first band. Accordingly, patterned dichroic filter attains a smaller aperture for the second band (e.g., the dual bandpass zone 402) relative to the aperture the first band (e.g., the first-band only bandpass zone 404 along with the dual bandpass zone 402). Optionally, in some examples, a rear face of the patterned dichroic filter 400 may have a broad-band anti-reflective coating. In other examples, the rear face of the patterned dichroic filter 400 may be clear/uncoated. In an example, the dual bandpass zone 402 is 4 millimeters in diameter, and the first-band only bandpass zone 404 has an external diameter of 6 millimeters. The dichroic coating process may enable small transition widths between the different filter coatings, e.g., <100 micrometers, <10 micrometers, or less than 5 micrometers between distinct surface coating regions for the dual bandpass zone 402 and the first-band only bandpass zone 404. The central and annular region may be centered accurately, e.g., within +/−100 micrometers, within +/−10 micrometers, or within +/−5 micrometers.

When a wavelength-dependent aperture is included, if the wavelength-dependent aperture includes a dual bandpass zone as described above, such dual bandpass zone of the wavelength dependent aperture may be used to filter received light in a transition region of the switchable filter between the two spectral bands. For example, a wavelength-dependent aperture with a dual bandpass zone may be used instead of or in addition to a separate dual bandpass filter.

When included, a wavelength-dependent aperture and/or wavelength-dependent filter may be used to control relative lighting efficiency of system between bands and/or for adjustment of DOF as needed, such as increasing RGB image DOF by increased F-number (i.e., F/1.8), while maintaining high efficiency for IR illumination (i.e., F/1.4), so as to minimize IR light optical power required to illuminate a scene even at relatively large z-depths For example, for the IR aperture may be made larger (e.g., to achieve better resolve, higher efficiency, improved SNR, and/or less IR light power required from an illuminator (e.g., an illuminator of optical system 100 and/or a separate light source), reducing thermal and/or safety impacts of IR illumination. In the same optical system, the RGB image could have improved depth of field DOF while maintaining reasonable resolve. For example, visible light may be transmitted through the wavelength-dependent aperture with an effective F-number of 1.8, whereas IR light may be transmitted with an effective F-number of 1.4. FIG. 4A shows one particular arrangement of dichroic coatings in an annular pattern. Other dichroic surface patterns may be used to accomplish a wavelength-dependent aperture element according to the present disclosure. For example, a patterned dichroic filter may include a dual-bandpass coating on one entire side, with a rear face having an outer annular region with a first-band only bandpass coating.

As one non-limiting alternative to a patterned dichroic filter 400, FIG. 4B shows a wavelength dependent aperture element comprising a filter stack 400' of filters including an opaque max stop 406' forming a first larger aperture, a dual bandpass filter 412, and a first band filter 410. The filters are shown rotated (relative to their position in the stack) to show how the filters form apertures in the optical path. The first band filter 410 includes a first-band only bandpass zone 404' configured to transmit the first spectral band, and a second, smaller aperture within the first-band only bandpass zone 404'. The smaller aperture is formed by a clear or broad-band anti-reflective region 408' configured to transmit both of the first spectral band and the second spectral band. The opaque max stop 406' may be any suitable material, e.g., a metal washer.

The components of the filter stack accomplish the same wavelength-dependent aperture and filtering as the patterned dichroic filter 400 of FIG. 4A. In particular, the first-band only bandpass zone 404' and clear or anti-reflective region 408' together with max stop 406' act as a first filter region that permits light from only the first spectral band, and the dual bandpass filter 412 along with the clear or anti-reflective region 408' act as a second, smaller filter region that permits light from both spectral bands.

In some cases, the separate components of filter stack 400' may be simpler to manufacture as compared to patterned dichroic filter 400. The components of filter stack 400' may be placed anywhere in the optical path between an external focusing lens of the optical path and the sensor. Furthermore, the components of filter stack 400' may be arranged in any order, and optionally separated by any other optical components (e.g., lenses, filters, and/or switchable filter(s)).

In some examples, as described above, an optical system with a multi-spectral optical element and a switchable filter may be configured for operation with IR and VIS spectral bands. Accordingly, it may be advantageous to use a larger depth of field for the VIS spectral band (e.g., as described with regard to FIG. 3C). For example, using a smaller depth of field for IR may increase an efficiency of detection of received IR light, maintaining spatial frequency response of the IR image, while reducing an amount of IR illumination needed for high-quality low noise imaging, and thereby reducing an amount of light-emitting devices needed for illumination, electricity expended by the illumination, and/or heat produced by IR illumination. Furthermore, the examples and techniques described herein may be applied for any two spectral bands, with any choice of "first spectral band," and "second spectral band," as pertains to the above description (e.g., the first spectral band could be UV, IR, VIS, or any other suitable spectral band; similarly the second spectral band could be any other choice of UV, IR, VIS, or any other suitable spectral band).

In an example, an optical system, comprises: a multi-spectral optical element configured to receive light in at least a first spectral band and a second spectral band; a switchable filter; and a dual bandpass filter disposed between the multi-spectral optical element and the switchable filter, where the dual bandpass filter is configured to filter out wavelengths of light in a transition region of the switchable filter between the first spectral band and the second spectral band, and to filter out wavelengths of light outside a spectral region spanned by both the first spectral band and the second spectral band. In this or any other example, the switchable filter is configured to selectively filter light received from the dual bandpass filter in the first spectral band in a first mode and in a second mode, such that in the first mode the switchable filter transmits light in the first spectral band and in the second mode the switchable filter does not transmit light in the first spectral band. In this or any other example, the optical system further comprises a sensor disposed at an image plane and configured to detect light transmitted via the switchable filter, wherein the sensor is sensitive to at least the first spectral band and the second spectral band, and wherein, for the image plane, the multi-spectral optical element is configured to produce a modulation transfer function value that is above a predetermined threshold for each of the first spectral band and the second spectral band. In this or any other example, the predetermined threshold is 30% of a normalized maximum value. In this or any other example, the predetermined threshold is 50% of a normalized maximum value. In this or any other example, the multi-spectral optical element includes a multi-spectral lens having a first focal distance for the first spectral band and a second, different focal distance for the second spectral band. In this or any other example, the multi-spectral optical element is configured to image the received light onto the image plane, the image plane being disposed at one of the first focal distance and the second focal distance. In this or any other example, the multi-spectral optical element is configured to image the received light onto the image plane, the image plane being disposed between the first focal distance and the second focal distance. In this or any other example, the multi-spectral optical element is configured to image the received light onto the image plane, the image plane being disposed less than 10 microns from one or both of the first focal distance and the second focal distance. In this or any other example, the distance is less than 5 microns. In this or any other example, the switchable filter is further configured, in the first mode, to not transmit light in the second spectral band while transmitting light in the first spectral band, and in the second mode, to transmit light the second spectral band while not transmitting light in the first spectral band. In this or any other example, the multi-spectral optical element, the switchable filter, and the sensor are operated to selectively image light in one of the first spectral band and the second spectral band while not imaging light in the other spectral band. In this or any other example, the first spectral band includes infrared light and the second spectral band includes visible light. In this or any other example, the switchable filter is an electronically-switched liquid crystal filter. In this or any other example, the switchable filter includes a switchable wavelength-dependent mirror. In this or any other example, the optical system further comprises a wavelength-dependent aperture element disposed between the sensor and a lens of the multi-spectral optical element. In this or any other example, the wavelength-dependent aperture element includes an external region configured to transmit one of the first spectral band and the second spectral band, and an internal region configured to transmit both of the first spectral band and the second spectral band. In this or any other example, the external region includes a first dichroic coating configured to transmit one of the first spectral band and the second spectral band, and a second, different dichroic coating configured to transmit both of the first spectral band and the second spectral band.

In an example, an optical system comprises: multi-spectral optical element configured to receive light in at least a first spectral band and a second spectral band; a switchable wavelength-dependent mirror; and a dual bandpass filter disposed between the multi-spectral optical element and the switchable wavelength-dependent mirror, where the dual bandpass filter is configured to filter out wavelengths of light in a transition region of the switchable wavelength-dependent mirror between the first spectral band and the second spectral band. In this or any other example, switchable wavelength-dependent mirror is configured to selectively filter light received from the dual bandpass filter in a first mode and in a second mode, such that in the first mode the switchable wavelength-dependent mirror transmits light in the first spectral band while reflecting light in the second spectral band, and in the second mode the switchable wavelength-dependent mirror reflects light in the first spectral band while transmitting light in the second spectral band. In this or any other example, the optical system further comprises: a sensor disposed at an image plane and configured to detect light transmitted via the switchable wavelength-dependent mirror, wherein the sensor is sensitive to at least the first spectral band and the second spectral band, and wherein, for the image plane, the multi-spectral optical element is configured to produce a modulation transfer function value that is above a predetermined threshold for each of the first spectral band and the second spectral band. In this or any other example, the switchable wavelength-dependent mirror includes a cholesteric-type liquid crystal.

In an example, an optical system comprises: a multi-spectral optical element configured to receive light in an infrared spectral band and a visible spectral band; a switchable filter; and a dual bandpass filter disposed between the multi-spectral optical element and the switchable filter, where the dual bandpass filter is configured to filter out wavelengths of light in a transition region of the switchable filter between the infrared spectral band and the visible spectral band. In this or any other example, the switchable filter is configured to selectively filter light received from the dual bandpass filter in a first mode and in a second mode, such that in the first mode the switchable filter transmits infrared light while not transmitting visible light, and in the second mode the switchable filter transmits visible light while not transmitting infrared light. In this or any other example, the optical system further comprises a sensor disposed at an image plane and configured to detect light transmitted via the switchable filter, wherein the sensor is sensitive to at least infrared light and visible light, and wherein, for the image plane, the multi-spectral optical element is configured to produce a modulation transfer function value that is above a predetermined threshold for each of infrared light and visible light. In this or any other example, the optical system further comprises a wavelength-dependent aperture element configured to transmit infrared light with a first depth of field, and to transmit visible light with a second, different depth of field.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An optical system, comprising:
a multi-spectral optical element configured to receive light in at least a first spectral band and a second spectral band;
a switchable filter;
a dual bandpass filter disposed between the multi-spectral optical element and the switchable filter, where the dual bandpass filter is configured to filter out wavelengths of light in a transition region of the switchable filter between the first spectral band and the second spectral band, and to filter out wavelengths of light outside a spectral region spanned by both the first spectral band and the second spectral band;
where the switchable filter is configured to selectively filter light received from the dual bandpass filter in the first spectral band in a first mode and in a second mode, such that in the first mode the switchable filter transmits light in the first spectral band and in the second mode the switchable filter does not transmit light in the first spectral band; and a sensor disposed at an image plane and configured to detect light transmitted via the switchable filter, wherein the sensor is sensitive to at least the first spectral band and the second spectral band, and wherein, for the image plane, the multi-spectral optical element is configured to produce a modulation transfer function value that is above a predetermined threshold for each of the first spectral band and the second spectral band.

2. The optical system of claim 1, wherein the predetermined threshold is 30% of a normalized maximum value.

3. The optical system of claim 1, wherein the predetermined threshold is 50% of a normalized maximum value.

4. The optical system of claim 1, wherein the multi-spectral optical element includes a multi-spectral lens having a first focal distance for the first spectral band and a second, different focal distance for the second spectral band.

5. The optical system of claim 4, wherein the multi-spectral optical element is configured to image the received light onto the image plane, the image plane being disposed at one of the first focal distance and the second focal distance.

6. The optical system of claim 4, wherein the multi-spectral optical element is configured to image the received light onto the image plane, the image plane being disposed between the first focal distance and the second focal distance.

7. The optical system of claim 4, wherein the multi-spectral optical element is configured to image the received light onto the image plane, the image plane being disposed less than 10 microns from one or both of the first focal distance and the second focal distance.

8. The optical system of claim 7, wherein the distance is less than 5 microns.

9. The optical system of claim 1, wherein the switchable filter is further configured, in the first mode, to not transmit light in the second spectral band while transmitting light in the first spectral band, and in the second mode, to transmit light the second spectral band while not transmitting light in the first spectral band.

10. The optical system of claim 9, wherein the multi-spectral optical element, the switchable filter, and the sensor are operated to selectively image light in one of the first spectral band and the second spectral band while not imaging light in the other spectral band.

11. The optical system of claim 1, wherein the first spectral band includes infrared light and the second spectral band includes visible light.

12. The optical system of claim 1, wherein the switchable filter is an electronically-switched liquid crystal filter.

13. The optical system of claim 1, wherein the switchable filter includes a switchable wavelength-dependent mirror.

14. The optical system of claim 1, further including a wavelength-dependent aperture element disposed between the sensor and a lens of the multi-spectral optical element.

15. The optical system of claim 14, wherein the wavelength-dependent aperture element includes an external region configured to transmit one of the first spectral band and the second spectral band, and an internal region configured to transmit both of the first spectral band and the second spectral band.

16. The optical system of claim 15, wherein the external region includes a first dichroic coating configured to transmit one of the first spectral band and the second spectral band, and a second, different dichroic coating configured to transmit both of the first spectral band and the second spectral band.

17. An optical system, comprising:
a multi-spectral optical element configured to receive light in at least a first spectral band and a second spectral band;
a switchable wavelength-dependent mirror;
a dual bandpass filter disposed between the multi-spectral optical element and the switchable wavelength-dependent mirror, where the dual bandpass filter is configured to filter out wavelengths of light in a transition region of the switchable wavelength-dependent mirror between the first spectral band and the second spectral band;
where the switchable wavelength-dependent mirror is configured to selectively filter light received from the dual bandpass filter in a first mode and in a second mode, such that in the first mode the switchable wavelength-dependent mirror transmits light in the first spectral band while reflecting light in the second spectral band, and in the second mode the switchable wavelength-dependent mirror reflects light in the first spectral band while transmitting light in the second spectral band; and
a sensor disposed at an image plane and configured to detect light transmitted via the switchable wavelength-dependent mirror, wherein the sensor is sensitive to at least the first spectral band and the second spectral band, and wherein, for the image plane, the multi-spectral optical element is configured to produce a modulation transfer function value that is above a predetermined threshold for each of the first spectral band and the second spectral band.

18. The optical system of claim 17, wherein the switchable wavelength-dependent mirror includes a cholesteric-type liquid crystal.

19. An optical system, comprising:
a multi-spectral optical element configured to receive light in an infrared spectral band and a visible spectral band;
a switchable filter;
a dual bandpass filter disposed between the multi-spectral optical element and the switchable filter, where the dual bandpass filter is configured to filter out wavelengths of light in a transition region of the switchable filter between the infrared spectral band and the visible spectral band;
where the switchable filter is configured to selectively filter light received from the dual bandpass filter in a first mode and in a second mode, such that in the first mode the switchable filter transmits infrared light while not transmitting visible light, and in the second mode the switchable filter transmits visible light while not transmitting infrared light; and
a sensor disposed at an image plane and configured to detect light transmitted via the switchable filter, wherein the sensor is sensitive to at least infrared light and visible light, and wherein, for the image plane, the multi-spectral optical element is configured to produce a modulation transfer function value that is above a predetermined threshold for each of infrared light and visible light.

20. The optical system of claim 19, further comprising a wavelength-dependent aperture element configured to transmit infrared light with a first depth of field, and to transmit visible light with a second, different depth of field.

* * * * *